US012752930B2

(12) United States Patent
Horner

(10) Patent No.: US 12,752,930 B2
(45) Date of Patent: Oct. 6, 2026

(54) FLIGHT CONTROL SYSTEM DIGITAL SURFACE POSITION SENSOR WITH COMMAND-RESPONSE MONITOR AND MECHANICAL DISCONNECT MONITOR

(71) Applicant: HONEYWELL INTERNATIONAL INC., Charlotte, NC (US)

(72) Inventor: Darrell W. Horner, Tempe, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 86 days.

(21) Appl. No.: 18/662,485

(22) Filed: May 13, 2024

(65) Prior Publication Data

US 2025/0269977 A1 Aug. 28, 2025

Related U.S. Application Data

(60) Provisional application No. 63/557,071, filed on Feb. 23, 2024.

(51) Int. Cl.
*B64D 45/00* (2006.01)
*B64C 13/50* (2006.01)

(52) U.S. Cl.
CPC ........ *B64D 45/0005* (2013.01); *B64C 13/503* (2013.01); *B64D 2045/0085* (2013.01)

(58) Field of Classification Search
CPC ................................................ B64D 45/0005
See application file for complete search history.

(56) References Cited

U.S. PATENT DOCUMENTS

| | | | | |
|---|---|---|---|---|
| 4,017,045 | A | 4/1977 | Zhou et al. | |
| 7,567,862 | B2 | 7/2009 | Pelton et al. | |
| 8,818,573 | B2 | 8/2014 | Goupil et al. | |
| 9,156,563 | B2 | 10/2015 | Pennell et al. | |
| 9,405,277 | B2 | 8/2016 | Cameron | |
| 10,082,442 | B2 | 9/2018 | Yasui | |
| 10,486,792 | B2 | 11/2019 | Hagerott et al. | |
| 11,117,650 | B2 * | 9/2021 | Dee | G05B 11/42 |
| 12,366,464 | B2 * | 7/2025 | Horner | B64C 13/50 |
| 12,422,866 | B2 * | 9/2025 | Peters | G05D 1/85 |
| 2025/0219556 | A1 * | 7/2025 | Hanus | H02P 6/16 |
| 2025/0269977 | A1 * | 8/2025 | Horner | B64D 45/00 |

FOREIGN PATENT DOCUMENTS

| | | | |
|---|---|---|---|
| CA | 2622705 | A1 | 8/2008 |
| CN | 116353838 | A | 6/2023 |
| FR | 2872483 | A1 | 1/2006 |

* cited by examiner

*Primary Examiner* — Michael A Berns
(74) *Attorney, Agent, or Firm* — Ingrassia Fisher & Lorenz

(57) ABSTRACT

A digital surface position sensor includes a position sensor, an adaptable hardware input, and a processing circuit. The position sensor is adapted to be coupled to an aircraft flight control surface The adaptable hardware input provides an identification signal that identifies the aircraft flight control surface to which the position sensor is coupled. The processing circuit is configured to generate sensor actuator position data representative of flight control surface actuator position, determine flight control surface actuator position error, and generate a fault signal when the flight control surface actuator position error exceeds a predetermined threshold.

20 Claims, 8 Drawing Sheets

FLIGHT CONTROL SYSTEM DIGITAL SURFACE POSITION SENSOR WITH COMMAND-RESPONSE MONITOR AND MECHANICAL DISCONNECT MONITOR

CROSS REFERENCE TO RELATED APPLICATION

The present application claims benefit of prior filed U.S. Provisional Patent Application No. 63/557,071, filed Feb. 23, 2024, which is hereby incorporated by reference herein in its entirety.

TECHNICAL FIELD

The present disclosure relates to aircraft flight control systems, and more particularly to flight control system digital surface position sensors and position sensing systems, and more particularly to aircraft flight control surface position sensors and sensing systems with command-response monitor and mechanical disconnect monitor functions.

BACKGROUND

Modern aircraft are evolving to a more-electric architecture for actuation requirements, including for flight control surface control, engine tilt control, and propeller pitch control—as well as a number of other utility applications. More electric control relies on the use of electro-mechanical actuators (EMAs) with electro-mechanical motors. Electro-mechanical actuators in turn rely on electro-mechanical actuator controllers (EMACs). Some aircraft actuation requirements are categorized as flight critical and thus require high integrity EMA control to prevent loss of control or erroneous control. Because of the flight criticality, EMACs, which contain electronic circuitry and software, must also be of high integrity.

Most EMAs contain output position sensors that the EMACs utilize as feedback for their control. However, in some cases, additional sensors are mounted on the aircraft flight control surfaces to provide additional position feedback that is redundant to the EMA position sensors. These surface position sensors (SPS) are utilized by the flight control system to determine if there is a mechanical disconnect between the EMA and the controlled surface. These sensors can also be used by the flight control system as a redundant, dis-similar feedback to ensure that the EMA/EMAC sub-system is controlling according to the flight control system's position command. This is known as command-response monitoring.

In some instances, it may be desirable to implement the command-response monitor function and/or mechanical disconnect function outside of the flight control system computers. For such instances, EMACs have been designed to perform these functions. However, such designs require that these functions be implemented independent of the complex electronic devices used in the EMACs. This in turn requires additional circuitry, such as an additional microcontroller, apart from the EMACs electronics and actuator position sensor transmission path. This increases the EMAC size, weight, and development complexity. In some instances, to ensure true independence, redundant position sensors may also be needed, which adds additional cost, weight, and actuator mechanical complexity.

Hence, there is a need for a way to implement the command-response monitor function and/or mechanical disconnect function outside of the flight control system computers that does not increase the size, weight, and complexity of the EMAC. This disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a digital surface position sensor includes a position sensor, an adaptable hardware input, and a processing circuit. The position sensor is adapted to be coupled to an aircraft flight control surface and is configured to sense a position of the aircraft flight control surface and supply a surface position signal representative thereof. The adaptable hardware input provides an identification signal that identifies the aircraft flight control surface to which the position sensor is coupled. The processing circuit is coupled to receive the surface position signal and the identification signal, and is also adapted to receive flight control surface actuator position command data indicative of a commanded position of a flight control surface actuator. The processing circuit is configured to: (i) process the surface position signal and the identification signal to generate sensor actuator position data representative of flight control surface actuator position, (ii) process the sensor actuator position data and the flight control surface actuator position command data to determine flight control surface actuator position error, and (iii) generate a fault signal when the flight control surface actuator position error exceeds a predetermined threshold.

In another embodiment, an aircraft flight control surface position sensing system includes a flight control computer and a digital surface position sensor. The flight control computer is configured to generate and supply flight control surface actuator position command data that is indicative of a commanded position of a flight control surface actuator. The digital surface position sensor is in operable communication with the flight control computer and includes a position sensor, an adaptable hardware input, and a processing circuity. The position sensor is adapted to be coupled to an aircraft flight control surface and is configured to sense a position of the aircraft flight control surface and supply a surface position signal representative thereof. The adaptable hardware input provides an identification signal that identifies the aircraft flight control surface to which the position sensor is coupled. The processing circuit is coupled to receive the surface position signal, the identification signal, and the flight control surface actuator position command data. The processing circuit is configured to: (i) process the surface position signal and the identification signal to generate sensor actuator position data representative of flight control surface actuator position, (ii) process the sensor actuator position data and the flight control surface actuator position command data to determine flight control surface actuator position error, and (iii) generate a fault signal when the flight control surface actuator position error exceeds a predetermined threshold.

In yet another embodiment, an aircraft fly-by-wire flight control system includes a flight control surface actuator controller, a flight control surface actuator, a flight control inceptor, a flight control computer, and a digital surface position sensor. The flight control surface actuator controller is coupled to receive flight control surface actuator position command data that is indicative of a commanded position of a flight control surface actuator and is configured, upon receipt of the flight control surface actuator position command data, to generate and supply flight control surface actuator commands. The flight control surface actuator is coupled to receive the flight control surface actuator commands from the flight control surface actuator controller and is configured, upon receipt thereof, to move the flight control surface to the commanded position. The flight control inceptor is configured to receive user input from a user and is configured, in response to the user input, to supply inceptor command data. The flight control computer is in operable communication with the flight control inceptor and the flight control surface actuator controller. The flight control computer is coupled to receive the inceptor command data from the flight control inceptor and is configured, upon receipt of the inceptor data, to generate and supply the flight control surface actuator position command data to the flight control surface actuator controller. The digital surface position sensor is in operable communication with the flight control computer and the flight control surface actuator controller, and includes a position sensor, an adaptable hardware input, and a processing circuit. The position sensor is adapted to be coupled to the aircraft flight control surface and is configured to sense a position of the aircraft flight control surface and supply a surface position signal representative thereof. The adaptable hardware input provides an identification signal that identifies the aircraft flight control surface to which the position sensor is coupled. The processing circuit is coupled to receive the surface position signal, the identification signal, and the flight control surface actuator position command data and is configured to: (i) process the surface position signal and the identification signal to generate sensor actuator position data representative of flight control surface actuator position, (ii) process the sensor actuator position data and the flight control surface actuator position command data to determine flight control surface actuator position error, and (iii) generate a fault signal when the flight control surface actuator position error exceeds a predetermined threshold.

Furthermore, other desirable features and characteristics of the digital surface position sensor will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
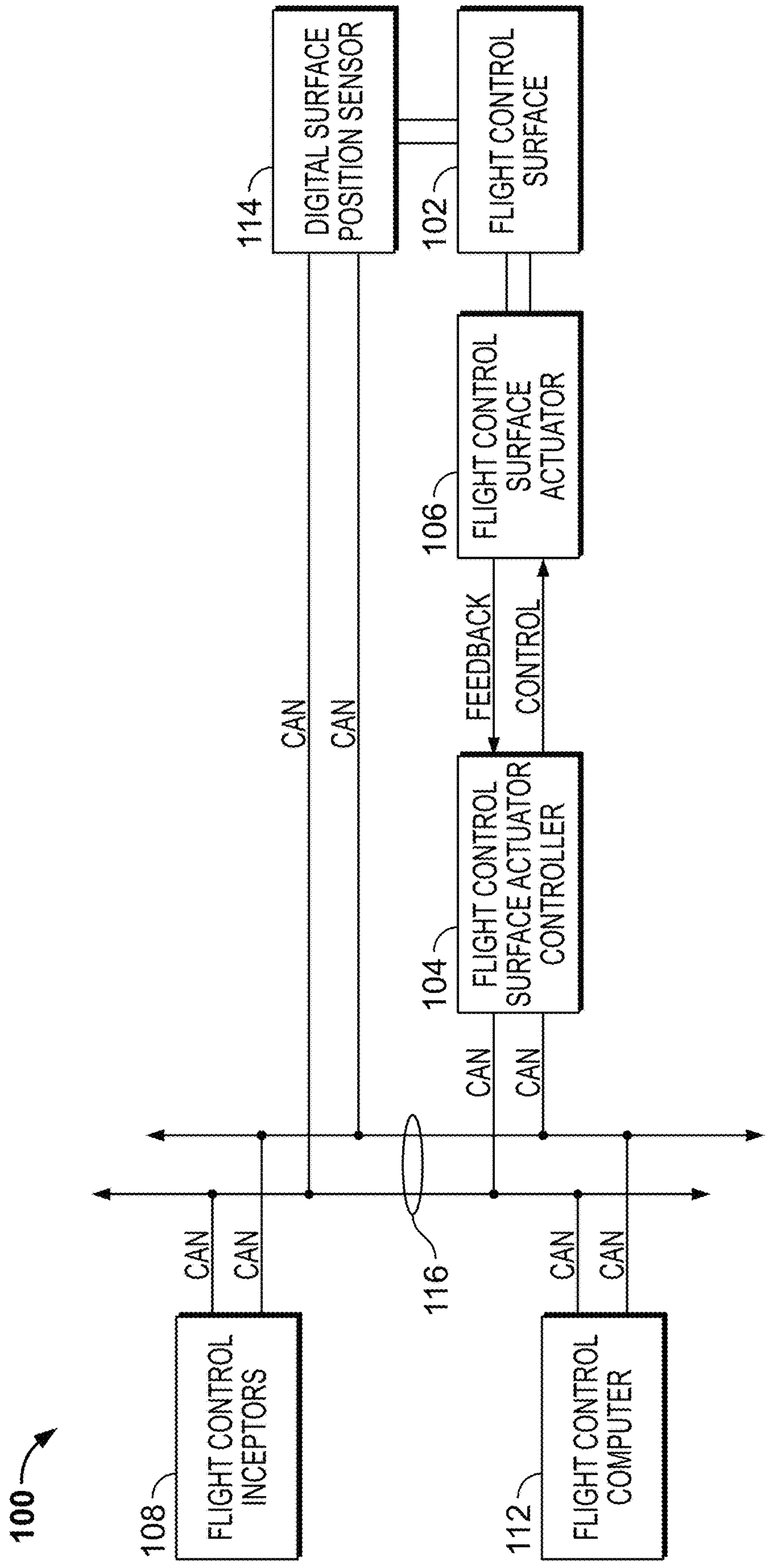
FIG. 1 depicts a functional block diagram of one embodiment of an aircraft fly-by-wire flight control system.

Referring to FIG. 1, a functional block diagram of one embodiment of an aircraft fly-by-wire flight control system 100 is depicted. For simplicity, ease of illustration, and ease of description, the depicted system 100 is configured to control the position of a single flight control surface 102. It will be appreciated, however, that in other embodiments, such as the one described further below, the system 100 may be configured to control multiple flight control surfaces.

The depicted system 100 includes at least one flight control surface actuator controller 104, at least one flight control surface actuator 106, one or more flight control inceptors 108, at least one flight control computer 112, and at least one digital surface position sensor 114. The flight control surface actuator controller(s) 104 is coupled to receive flight control surface position command data that is indicative of a commanded position of the flight control surface 102. The flight control surface actuator controller(s) 104 is configured, upon receipt of the flight control surface position command data, to generate and supply flight control surface actuator commands to the flight control surface actuator 106.

The flight control surface actuator(s) 106 is coupled to receive the flight control surface actuator commands from the flight control surface actuator controller 104 and is configured, upon receipt thereof, to move the flight control surface 102 to the commanded position. It will be appreciated that the flight control surface actuator(s) 106 may be implemented using any one of numerous known actuators, but in the depicted embodiment it is implemented using an electromechanical actuator, such as, for example, a motor-driven ball screw actuator. As FIG. 1 also depicts, the flight control surface actuator(s) 106 supplies feedback (e.g., position feedback) to the flight control surface actuator controller 104. The flight control surface actuator controller 104 processes the position feedback from the flight control surface actuator(s) 106 to generate actuator controller position data that is indicative of the actual position of the flight control surface actuator(s) 106.

The flight control inceptor(s) 108 is in operable communication with the flight control surface actuator controller(s) and the flight control computer(s) 112. The flight control inceptor(s) 108 is configured to receive user input from a user (e.g., a pilot) and is configured, in response to the user input, to supply the inceptor command data to the flight control computer(s) 112. The flight control inceptor(s) 108 may be implemented as a yoke, a side stick, a collective, and/or a rudder pedal, just to name a few non-limiting examples.

The flight control computer(s) 112 is in operable communication with the flight control inceptor(s) 108 and the flight control surface actuator controller(s) 104. The flight control computer(s) 112 is coupled to receive the inceptor command data from the flight control inceptor(s) 112 and is configured, upon receipt of the inceptor data, to generate and supply the flight control surface position command data to the flight control surface actuator controller 104.

The digital surface position sensor(s) 114 is in operable communication with at least the flight control computer(s) 112. The digital surface position sensor(s) 114 is coupled to, and is configured to sense the position of, the aircraft flight control surface 102 and supply a position signal representative thereof to the flight control computer(s) 112. The digital surface position sensor(s) is also configured to implement additional functions, which will be described momentarily. Before doing so, however, it is noted that the flight control surface actuator controller(s) 104, the flight control inceptor(s) 108, the flight control computer(s) 112, and the digital surface position sensor(s) 114 are all in operable communication via a suitable communication bus architecture 116 that implements a dual-network bus protocol. Although various buses and associated protocols could be used, in the depicted embodiment Controller Area Network protocol (CAN bus) architecture is used. In other embodiments, the RS485 communication bus may be used. Although other bus architectures/technologies may be utilized, the CAN bus architecture and RS485 bus architecture are preferred because these utilize only two wires per bus, and because many flight control system computers and avionics computers already have built-in CAN and RS485 bus interfaces.

Returning to the description, and with reference now to FIG. 2, one embodiment of the digital surface position sensor 114 will now be described. The digital surface position sensor 114 includes at least a position sensor 202, an adaptable hardware input 204, and a processing circuit 206. The position sensor 202 is adapted to be coupled to the aircraft flight control surface 102. To do so, the depicted digital surface position sensor 114 includes a mechanical interface shaft 208 that is used to couple the aircraft flight control surface 102 to the position sensor 202. The position sensor 202 is configured to sense the position of the aircraft flight control surface 102 and supply a position signal representative thereof. Although the position sensor 202 may be implemented using any one of numerous known types of sensors, in the depicted embodiment it is implemented using a Hall sensor 212 and a magnet 214. The magnet 214 is coupled to, and rotates with, the mechanical interface shaft 208, and the Hall sensor 212, as is known, supplies the position signal in response to the magnet 214 rotations by converting the magnetic flux to the position signal, which may be an analog sin/cos waveform or digital signal.

The adaptable hardware input 204 provides an identification signal that identifies the aircraft flight control surface 102 to which the position sensor 202 is coupled. In the depicted embodiment, the adaptable hardware input 204 includes pins and jumper wires that can be read by the processing circuit 206 to self-detect which aircraft flight control surface 102 the position sensor 202 is coupled. As used herein, this is called the "location identification" or LOC ID. The LOC ID may be represented in a specific valid open/ground pattern that can result in multiple valid LOC IDs. For example, these pins can be read in a binary code, and included in this could be an odd or even parity signal to ensure that the input is not compromised.

The processing circuit 206 may include one or more processors and computer-readable storage devices or media encoded with programming instructions for configuring the processing circuit 206. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the one or more processors.

The processing circuit 206 is coupled to receive the position signal and the identification signal and is configured, upon receipt of these signals, to process the position signal and the identification signal and generate a first digital signal and an independent second digital signal. The first digital position signal and the independent second digital signal are each representative of the position of, and the identification of, the aircraft flight control surface 102. The signals generated in the digital surface position sensor 114 may be transmitted as low-power digital signals, such as a Serial Peripheral Interface (SPI) or parallel bus or other bus on the market. In the depicted embodiment, as was already alluded do, the signals are transmitted as low-power digital signals having a digital bus protocol, such as the CAN bus protocol.

Preferably, the first digital position signal and the independent second digital signal are conditioned and protected by circuitry to transmit the signals out of the digital surface position sensor 114. To this end, and as FIG. 2 also depicts, the digital surface position sensor 114 additionally includes a first digital protocol bus driver 216, a second digital protocol bus driver 218, first signal conditioning circuitry 222, and second signal conditioning circuitry 224. The first digital protocol bus driver 216 is coupled to receive and convert the first digital position signal to a converted first digital position signal having a digital bus protocol, and the second digital protocol bus driver 218 is coupled to receive and convert the second digital position signal to a converted second digital position signal having the digital bus protocol. The first signal conditioning circuitry 222 is coupled to receive and transmit the converted first digital position signal supplied from the first digital protocol bus driver 216, and the second signal conditioning circuitry 224 is coupled to receive and transmit the converted second digital position signal supplied from the second digital protocol bus driver 218. It is noted that, at least in the depicted embodiment, the first and second digital protocol bus drivers 216, 218 are each Controller Area Network (CAN) bus drivers and the digital bus protocol is the CAN bus protocol.

When the digital surface position sensor 114 is installed, it is mechanically grounded (via a mounting flange) to a fixed surface, and the mechanical interface shaft 208 is coupled to the flight control surface 102. No mechanical calibration is required to find the "zero" point of the position sensor 202 (unlike with potentiometers, resolvers, and RVDTs). Instead, after installation, when the flight control surface 102 is set in its "null" position (e.g., aerodynamically neutral position), either the flight control computer 112 or the digital surface position sensor 114 can be configured to implement what is referred to herein as a pairing process. When the flight control computer 112 is configured to implement the pairing process, it does so in response to an input command. More specifically, upon receipt of the input command, the flight control computer 112 receives the first and second digital position signals from the digital surface position sensor when the aircraft flight control surface is in its stowed position. The flight control computer 112 then processes the first and second digital position signals to determine an offset position of the digital surface position sensor 114 relative to the stowed position, and then stores the offset position in non-volatile memory for use in computing actual aircraft flight control surface position. The flight control computer 112 is further configured to compute the actual aircraft flight control surface position by computing the difference between the offset position and the sensed position of the aircraft flight control surface 102.

When the digital surface position sensor 114 is configured to implement the pairing process, it also does so in response to an input command. More specifically, upon receipt of the input command, the processing circuit 206 processes the first and second digital position signals to determine an offset position of the digital surface position sensor 114 relative to the aerodynamically neutral position, and then stores the offset position in non-volatile memory for use in computing actual aircraft flight control surface position. The processing circuit 206 is further configured to compute the actual aircraft flight control surface position by computing the difference between the offset position and the sensed position of the aircraft flight control surface.

For completeness, an example of the pairing process, when implemented in the flight control computer 112, will now be described. For this description, it is assumed that the flight control surface 102 is a wing surface that is positioned in its 0-degrees position (e.g., null or aerodynamically neutral position), and that the associated digital surface position sensor 114 was randomly installed to read 22-degrees when the wing surface is in its 0-degree position. Upon receiving the input command, the flight control computer 112 reads +22-degrees from the digital surface position sensor 114, and thus stores this value as the offset in its non-volatile memory. Thereafter, for each position value supplied from the digital surface position sensor 114, the flight control computer 112 subtracts 22-degrees from the value. For example, if the wing surface is actually at 33-degrees, the digital surface position sensor 114 will transmit 55-degrees (33+22). When the flight control computer receives the 55-degrees value, it subtracts 22-degrees from this value, resulting in a 33-degree position for the wing surface.

Figure 2:
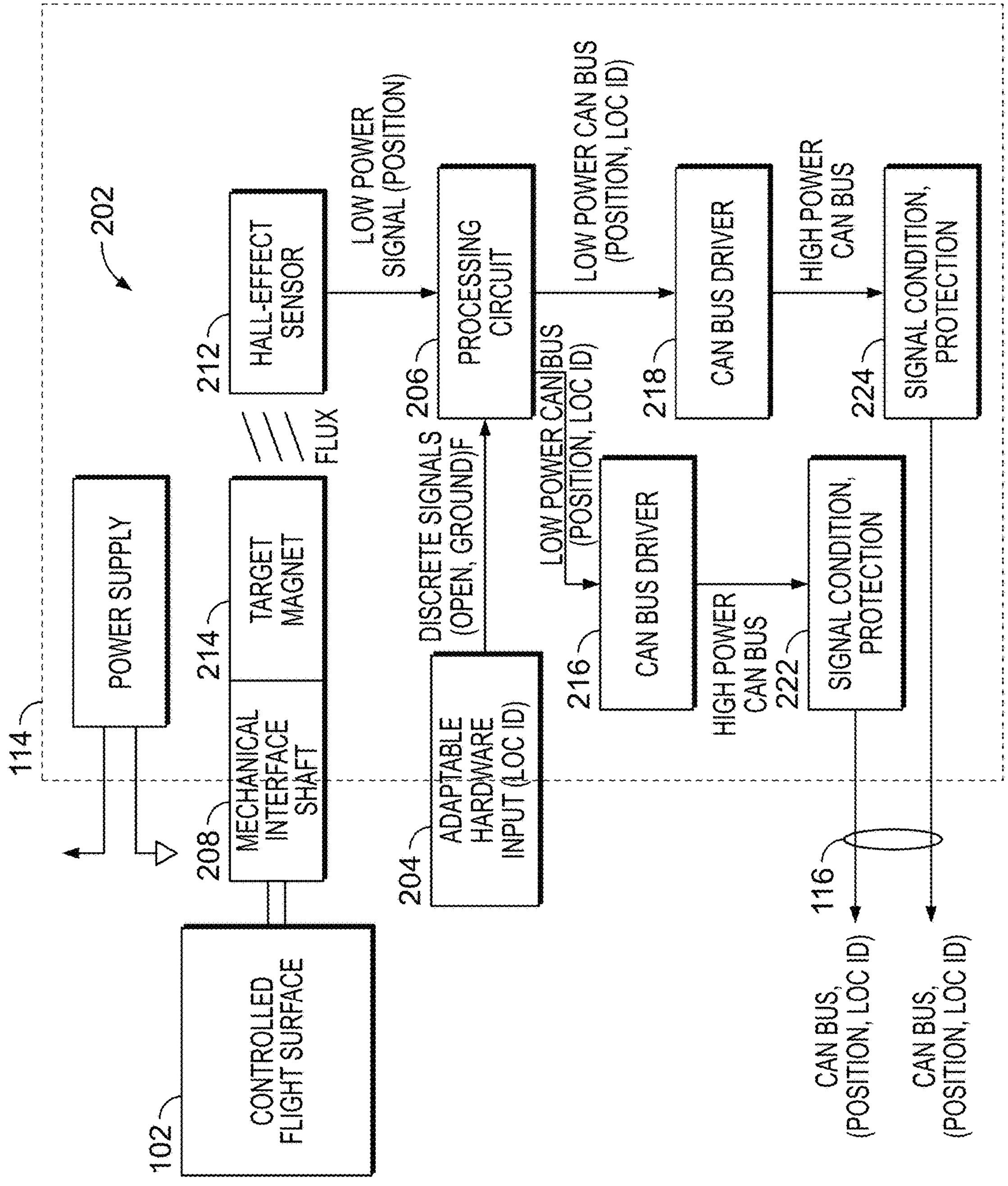
FIG. 2 depicts a functional block diagram of one embodiment of a digital surface position sensor that may be implemented in the system of FIG. 1.
Figure 3:
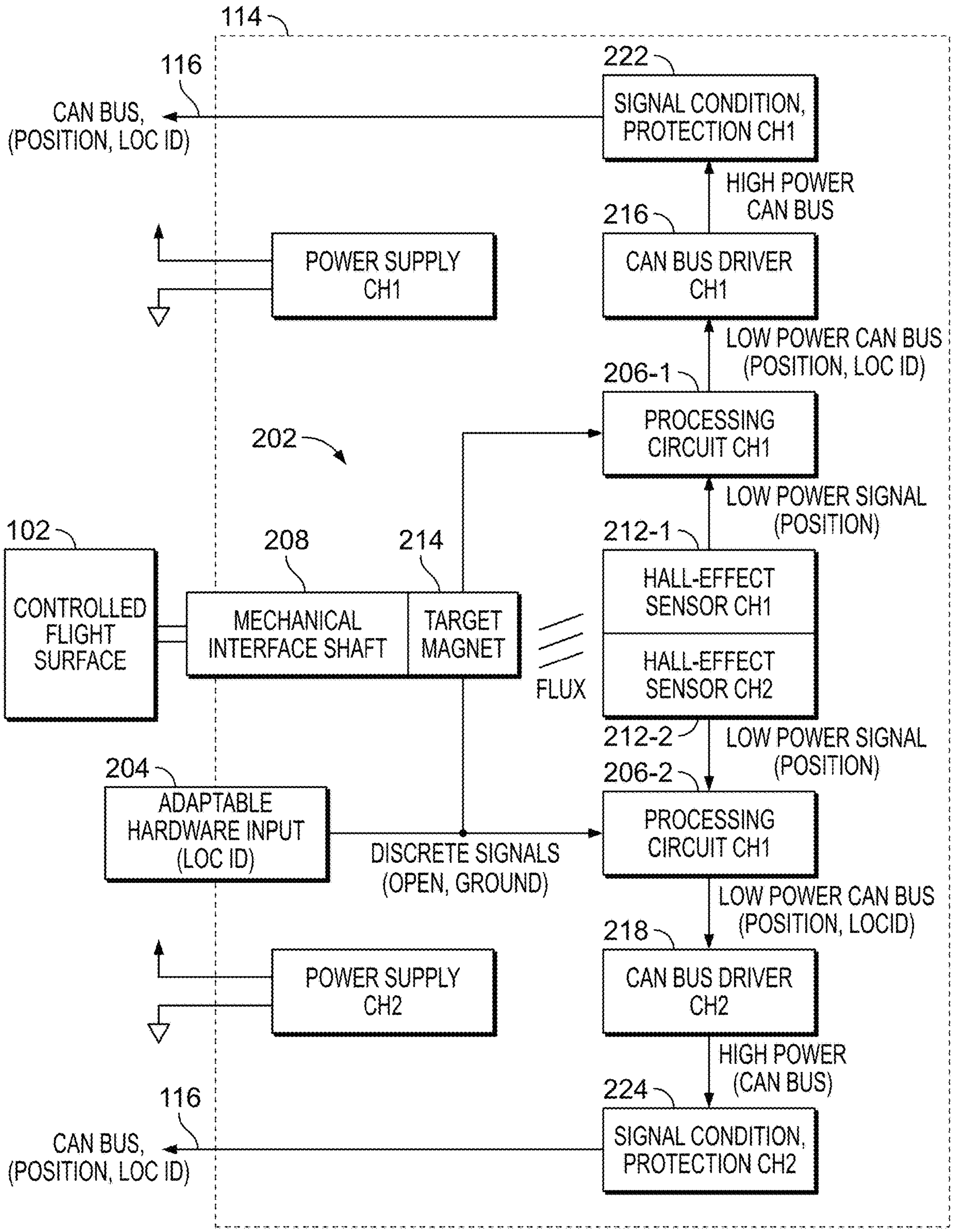
FIG. 3 depicts a functional block diagram of another embodiment of a digital surface position sensor that may be implemented in the system of FIG. 1.

The digital surface position sensor 114 depicted in FIG. 2 includes only one Hall sensor 212. It will be appreciated, however, that in some embodiments the digital surface position sensor 114 may include two Hall sensors 212 (212-1, 212-2). In such embodiments, one of which is depicted in FIG. 3, each sensor 212 and its associated circuitry (e.g., processing circuit 206-1, 206-2, digital protocol bus driver 216, 218, signal conditioning circuitry 222, 224) is preferably powered from its own separate power input.

Figure 4:
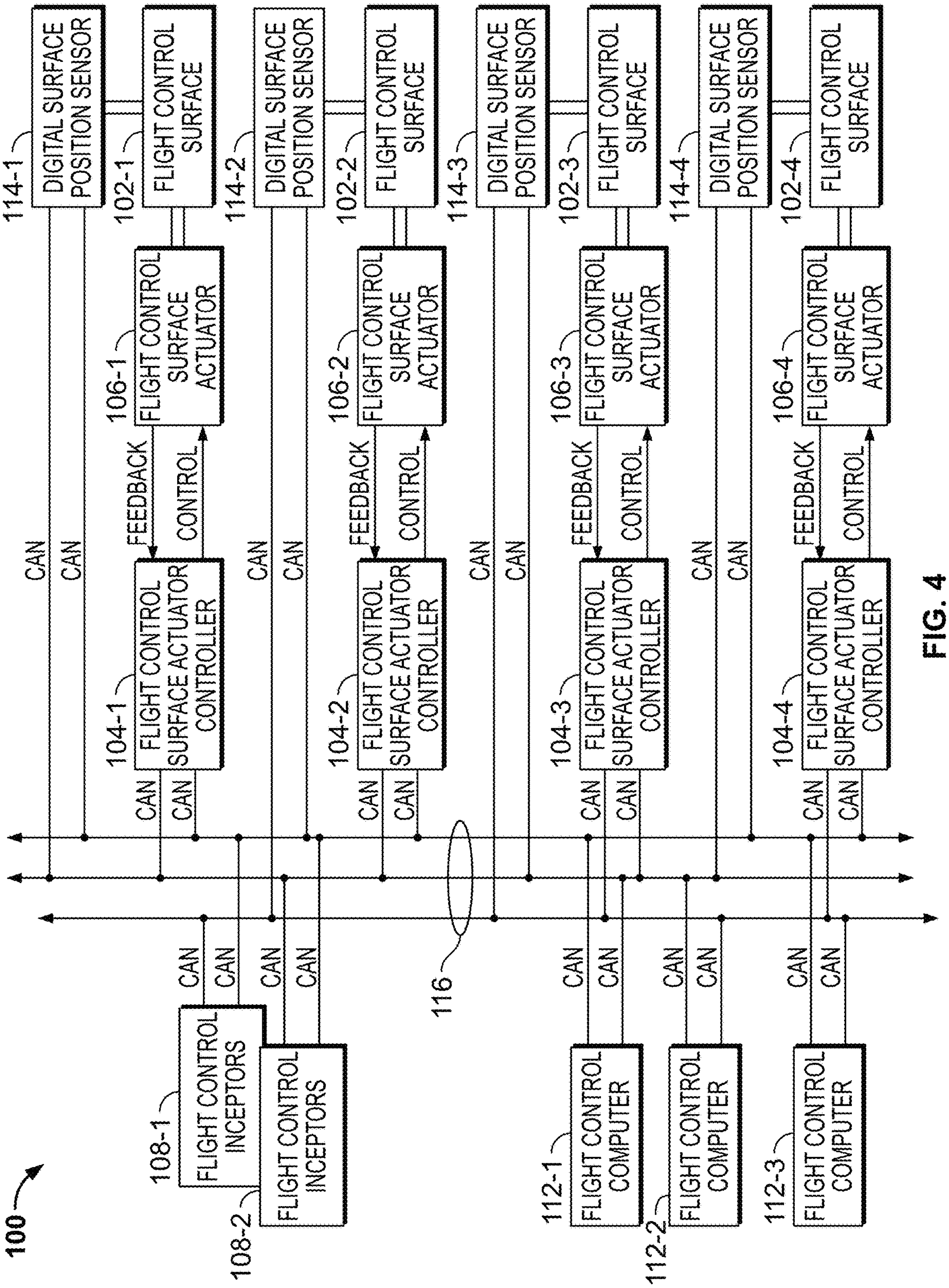
FIG. 4 a functional block diagram of another embodiment of an aircraft fly-by-wire flight control system.
Figure 5:
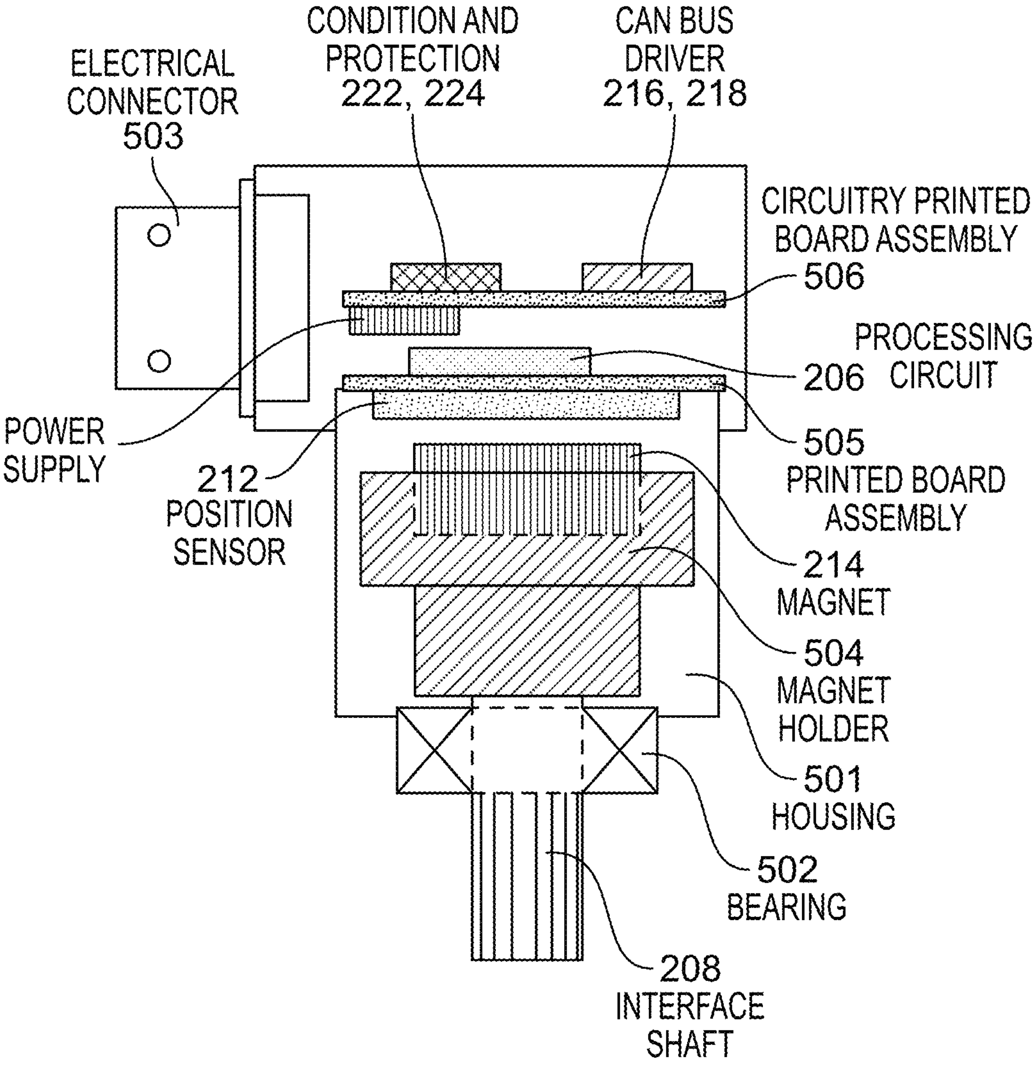
FIG. 5 depicts one embodiment of a physical implementation of the digital surface position sensor of FIG. 2 or 3.

Additionally, because the digital surface position sensor 114 is implemented using a dual-network bus protocol, redundant flight control surface positions are transmitted. This enables receipt of information in a parallel manner; for example, via different flight control surface actuator controllers 104 or flight control computers 112 that are redundant to each other (as alluded to above). Such a configuration is depicted in FIG. 4. This configuration allows different methods to check and balance the digital surface position sensor 114 output for integrity. Moreover, as will be described momentarily, the dual-network bus protocol also allows the digital surface position sensors 114 to be configured to implement a command-response monitor function.

More specifically, because of the dual-network bus protocol, each digital surface position sensor 114 can receive actuator position commands from multiple flight control computers 112. For example, with the embodiment depicted in FIG. 4, in which there are there are three flight control computers 112-1, 112-2, 112-3, the actuator position command data supplied by each of the three flight control computers 112-1, 112-2, 112-3 is received by each digital surface position sensor 114-1, 114-2, 114-3, 114-4.

Figure 6:
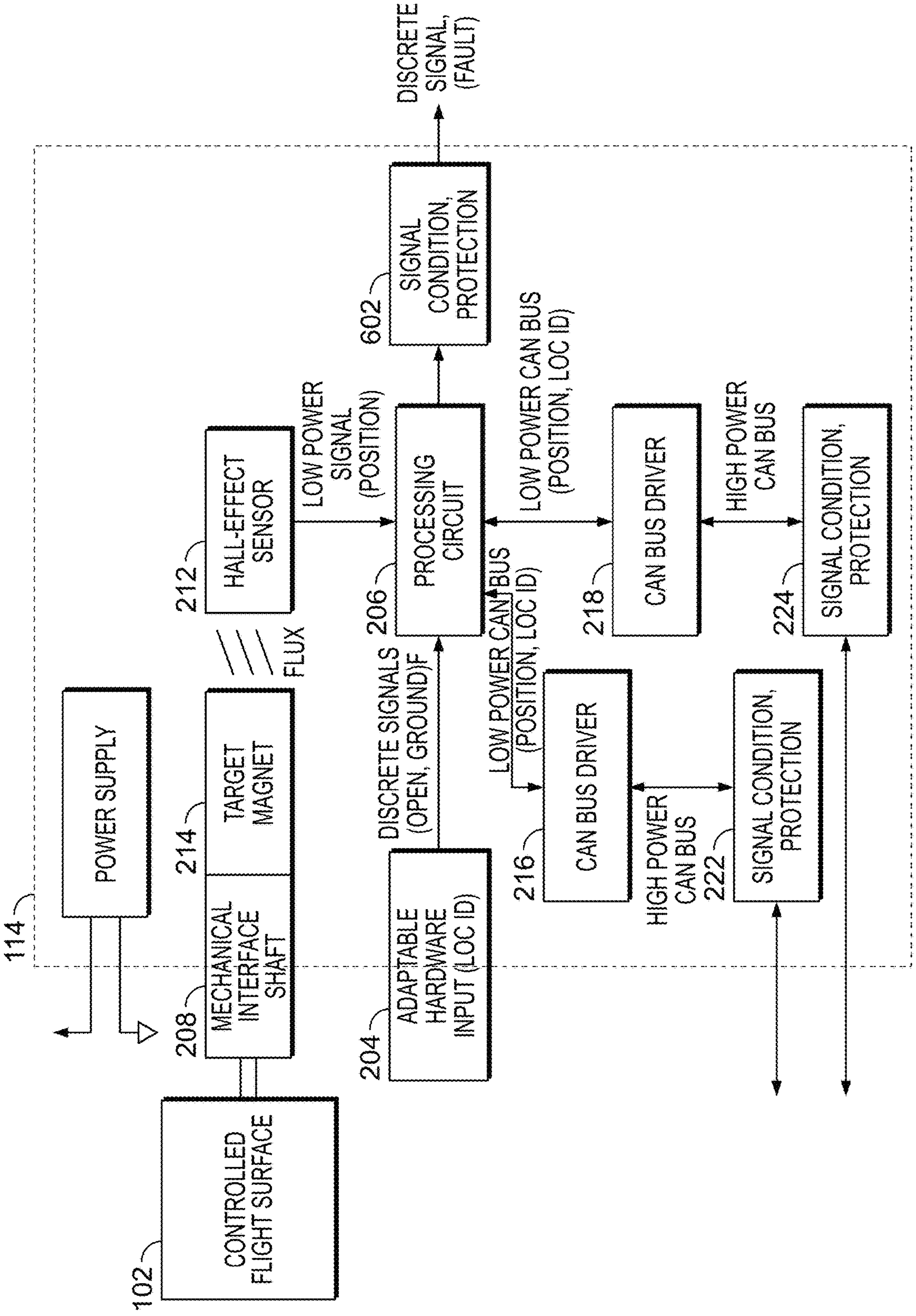
FIG. 6 depicts a functional block diagram of yet another embodiment of a digital surface position sensor that may be implemented in the systems of FIGS. 1 and 4.

Before describing the command-response monitor function, it should be noted that to facilitate this functionality, the digital surface position sensor 114 is preferably configured as depicted in FIG. 6. As this embodiment depicts, the digital surface position sensor 114 is configured to both transmit and receive signals. More specifically, in addition to the previously described functionalities, the first and second digital protocol bus drivers 216, 218 are coupled to receive, via the first and second signal conditioning circuitry 222, 224, respectively, at least flight control surface actuator position command data. The flight control surface actuator position command data is indicative of the commanded position of the associated flight control surface actuator 106. The first and second digital protocol bus drivers 216, 218 are additionally configured to supply the received flight control surface actuator position command data to the processing circuit 206. As FIG. 6 also depicts, the digital surface position sensor 114, at least in this embodiment, also includes third signal conditioning circuitry 602. The purpose of the third signal conditioning circuitry 602 is discussed further below.

It is additionally noted that, at least in some embodiments, each flight control surface actuator controller 104 is configured to implement validation and selection logic. The validation and selection logic validates the flight control surface position command data each flight control surface actuator controller 104 receives from each of the flight control computers 112 and selects, for further processing, the flight control surface position command data from one of the flight control computers 112. It will be appreciated that the flight control surface actuator controllers 104 may implement any one of numerous known validation and selection logic schemes. No matter which logic scheme is employed in the flight control surface actuator controllers 104, the same logic scheme is employed in each of the digital surface position sensor 114, and more specifically by the processing circuit 206 of each digital surface position sensor 206.

Turning now to a description of the command-response monitor function, as was noted above, the processing circuit 206 depicted in FIG. 6, in addition to receiving the surface position signal and the identification signal, also receives flight control surface actuator position command data. The processing circuit 206 is configured to process the surface position signal and the identification signal to generate sensor actuator position data representative of flight control surface actuator position. The processing circuit 206 is additionally configured to implement the above-mentioned validation and selection logic, and to then process the sensor actuator position data and the flight control surface actuator position command data to determine a flight control surface actuator position error. When the flight control surface actuator position error exceeds a predetermined threshold, this indicates that the associated flight control surface actuator(s) 102 is not being controlled according to its command, and thus the processing circuit 206 will generate a fault signal.

Figure 7:
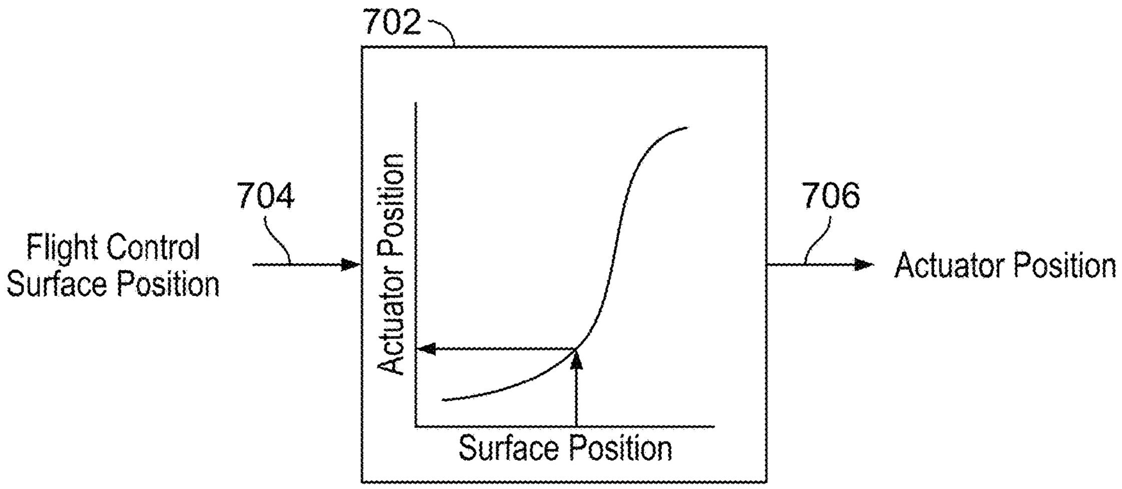
FIG. 7 depicts a simplified functional representation of one embodiment of a surface position-to-actuator position conversion algorithm that may be implemented in the digital surface position sensor of FIG. 6.

The processing circuit 206 may be variously configured to generate the sensor actuator position data from the surface position signal and the identification signal. In one embodiment, the processing circuit 206 implements a conversion algorithm 702, such as an equation or look-up table, as depicted in FIG. 7. As depicted therein, the input 704 to the conversion algorithm 702 is the flight control surface position 704 sensed by, for example, the position sensor 202, and the output 706 is the sensor actuator position. Preferably, though not necessarily, the conversion algorithm 702 is stored in the digital surface position sensor 114 and is specific to the aircraft flight control surface 102 to which the digital surface position sensor 114 is coupled. Thus, upon power-up, the LOC ID may be determined, and the correct relationship is used for the surface position-to-actuator position conversion.

Figure 8:
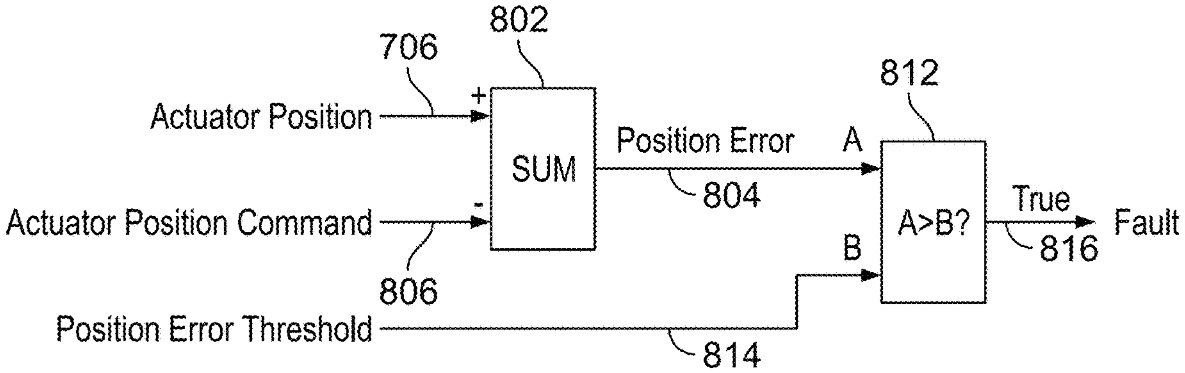
FIG. 8 depicts a simplified functional representation of one embodiment of command-response monitor logic that may be implemented in the digital surface position sensor of FIG. 6.

The processing circuit 206 may also be variously configured to determine the flight control surface actuator position error, and when the flight control surface actuator position error exceeds a predetermined threshold. In one embodiment, which is depicted in FIG. 8, the processing circuit 206 implements an arithmetic function 802, which calculates the flight control surface actuator position error 804 by determining, from the sensor actuator position data and the flight control surface actuator position command data, the arithmetic difference between the actual actuator position 706 and the commanded actuator position 806. The processing circuit 206 additionally implements a comparator function 812, which compares the actual actuator position 806 to the predetermined threshold 814 and, if the actual actuator position 806 exceeds the predetermined threshold 814, generates the fault signal 816.

Figure 9:
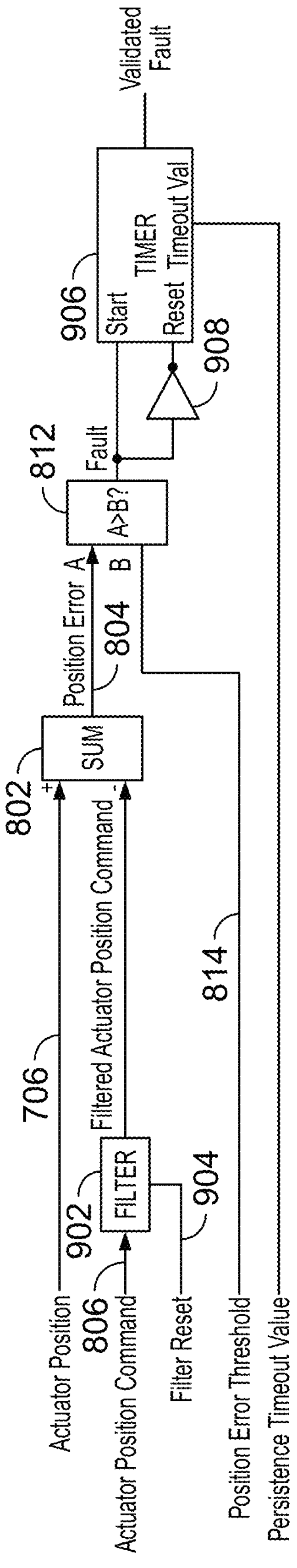
FIG. 9 depicts a simplified functional representation of another embodiment of command-response monitor logic that may be implemented in the digital surface position sensor of FIG. 6.

It should be appreciated that, in most implementations, the frequency response of the actuator control response may need to be determined, as fast actuator position commands may not be responded to in the actual system. Thus, in some embodiments, as is depicted in FIG. 9, the processing circuit 206 may additionally implement a command filter 902 that models the actual response of the flight control surface actuator 106 itself, to thereby provide a more accurate comparison. The command filter 902, when implemented, may be configured as any one of numerous types of filters depending, for example, on the flight control surface(s) 102 and control methods. The command filter 902 may have numerous and varied coefficients associated with the filter response, from a simple first-order Tustin filter having just a few coefficients, to a more complex set of filters having any number of coefficients, as needed to model the actual actuator control system response. Regardless of the particular type of filter 902 that is implemented, it may need to be periodically reset. Thus, as FIG. 9 also depicts, the filter 902 may also receive a reset signal 904 from, for example, the associated flight control computer(s) 112.

In some embodiments, the processing circuit 206 may also be configured to implement a fault persistence time, which corresponds to a predetermined amount of time to wait before generating the fault signal when the flight control surface actuator position error 804 exceeds the predetermined threshold 814. To provide this functionality, the processing circuit 206 may additionally implement the timer function 906 and inverter function 908 depicted in FIG. 9.

In addition to implementing the command-response monitor functionality that was just described, each digital surface position sensor 114 may also be configured to implement a disconnect monitor function. The disconnect monitor function determines if a flight control surface actuator 106 has become mechanically disconnected from its associated flight control surface 102. To do so, each digital surface position sensor 114, and more specifically the processing circuit 206 disposed in each digital surface position sensor 114, is coupled to receive the actuator controller position data from each of its associated actuator controller 104. That is, although not depicted in FIG. 4, if a flight control surface 102 is controlled via more than one actuator controller 104, the digital surface position sensor 114 associated with that flight control surface 102 will receive actuator controller position data from each of actuator controller 104 associated with that same flight control surface 102.

No matter the number of actuator controllers 104 that are used to control each flight control surface 102, each processing circuit 206 is further configured to process its sensor actuator position data and the actuator controller position data it receives to determine an actuator-to-surface position error. When the actuator-to-surface position error exceeds a predetermined threshold, this indicates that the associated flight control surface actuator(s) 106 is not connected to its associated flight control surface, and thus the processing circuit 206 will generate a disconnection fault signal. The disconnection fault signal is preferably transmitted to the flight control computers 112 via the communication bus architecture 116.

Returning to FIG. 6, it was previously noted that the depicted digital surface position sensor 114 may additionally include a third signal conditioning circuitry 602. This third signal conditioning output circuitry 602 is coupled to, and is configured to selectively supply a discrete fault signal to, its associated flight control surface actuator controller 104. More specifically, when the processing circuit 206 generates the fault signal upon determining that the flight control surface actuator position error exceeds the predetermined threshold, the third signal conditioning circuitry 602 generates and supplies the discrete fault signal. One advantage of supplying a discrete fault signal is that it can be directly supplied to the flight control surface actuator controller 104 via a single wire. As such, no complex devices are needed to shut down the flight control surface actuator controller 104. Such a wire run is relatively short and each flight control surface actuator controller 104 only receives a single discrete input to implement this functionality.

The digital surface position sensors described herein implement a command-response monitor function and/or mechanical disconnect function, thereby preventing an undesirable increase in the size, weight, and complexity of the flight control surface actuator controllers.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A digital surface position sensor, the digital surface position sensor comprising:

a position sensor adapted to be coupled to an aircraft flight control surface, the position sensor configured to sense a position of the aircraft flight control surface and supply a surface position signal representative thereof;

an adaptable hardware input comprising a plurality of pins configured to provide an identification signal in the form of an open or ground pattern that identifies the aircraft flight control surface to which the position sensor is coupled; and a processing circuit coupled to receive the surface position signal and the identification signal, and adapted to receive flight control surface actuator position command data indicative of a commanded position of a flight control surface actuator, the processing circuit configured to:

(i) process the surface position signal and the identification signal to generate sensor actuator position data representative of flight control surface actuator position, (ii) process the sensor actuator position data and the flight control surface actuator position command data to determine flight control surface actuator position error, and (iii) generate a fault signal when the flight control surface actuator position error exceeds a predetermined threshold.

2. The digital surface position sensor of claim 1, wherein:

the processing circuit is further adapted to receive actuator controller position data from an actuator controller, the actuator controller position data indicative of actual flight control surface actuator position;

the processing circuit is further configured to process the sensor actuator position data and the actuator controller position data to determine an actuator-to-surface position error; and generate a disconnection fault signal when the actuator-to-surface position error exceeds a predetermined threshold.

3. The digital surface position sensor of claim 2, wherein the processing circuit is further configured to implement a fault persistence time, the fault persistence time corresponding to a predetermined amount of time to wait before generating the fault signal when the actual actuator position exceeds the predetermined threshold.

4. The digital surface position sensor of claim 1, wherein:

the processing circuit implements a conversion algorithm to generate the sensor actuator position data; and the conversion algorithm is specific to the aircraft flight control surface to which the position sensor is coupled.

5. The digital surface position sensor of claim 1, wherein the processing circuit is further configured to:

implement a digital filter, the digital filter operable to filter the flight control surface actuator position command data to thereby supply filtered flight control surface actuator position command data; and process the sensor actuator position data and the filtered flight control surface actuator position command data to determine the flight control surface actuator position error.

6. The digital surface position sensor of claim 5, wherein the digital filter is adapted to receive a reset signal.

7. The digital surface position sensor of claim 1, wherein the processing circuit is further configured to process the position signal and the identification signal and generate (i) a first digital position signal representative of the position of, and the identification of, the aircraft flight control surface and (ii) and independent second digital signal representative of the position of, and the identification of, the aircraft flight control surface.

8. An aircraft flight control surface position sensing system, comprising:

a flight control computer configured to generate and supply flight control surface actuator position command data, the flight control surface actuator position command data indicative of a commanded position of a flight control surface actuator; and a digital surface position sensor in operable communication with the flight control computer, the digital surface position sensor comprising:

a position sensor adapted to be coupled to an aircraft flight control surface, the position sensor configured to sense a position of the aircraft flight control surface and supply a surface position signal representative thereof;

an adaptable hardware input comprising a plurality of pins configured to provide an identification signal in the form of an open or ground pattern that identifies the aircraft flight control surface to which the position sensor is coupled; and a processing circuit coupled to receive the surface position signal, the identification signal, and the flight control surface actuator position command data, the processing circuit configured to:

(i) process the surface position signal and the identification signal to generate sensor actuator position data representative of flight control surface actuator position, (ii) process the sensor actuator position data and the flight control surface actuator position command data to determine flight control surface actuator position error, and (iii) generate a fault signal when the flight control surface actuator position error exceeds a predetermined threshold.

9. The system of claim 8, wherein:

the processing circuit is further adapted to receive actuator controller position data from an actuator controller, the actuator controller position data indicative of actual flight control surface actuator position;

the processing circuit is further configured to process the sensor actuator position data and the actuator controller position data to determine an actuator-to-surface position error; and generate a disconnection fault signal when the actuator-to-surface position error exceeds a predetermined threshold.

10. The system of claim 9, wherein the processing circuit is further configured to implement a fault persistence time, the fault persistence time corresponding to a predetermined amount of time to wait before generating the fault signal when the actual actuator position exceeds the predetermined threshold.

11. The system of claim 8, wherein:

the processing circuit implements a conversion algorithm to generate the sensor actuator position data; and the conversion algorithm is specific to the aircraft flight control surface to which the position sensor is coupled.

12. The system of claim 8, wherein the processing circuit is further configured to:

implement a digital filter, the digital filter operable to filter the flight control surface actuator position command data to thereby supply filtered flight control surface actuator position command data; and process the sensor actuator position data and the filtered flight control surface actuator position command data to determine the flight control surface actuator position error.

13. The system of claim 12, wherein the digital filter is adapted to receive a reset signal.

14. The system of claim 8, wherein the processing circuit is further configured to process the position signal and the identification signal and generate (i) a first digital position signal representative of the position of, and the identification of, the aircraft flight control surface and (ii) and independent second digital signal representative of the position of, and the identification of, the aircraft flight control surface.

15. An aircraft fly-by-wire flight control system, comprising:

a flight control surface actuator controller coupled to receive flight control surface actuator position command data that is indicative of a commanded position of a flight control surface actuator, the flight control surface actuator controller configured, upon receipt of the flight control surface actuator position command data, to generate and supply flight control surface actuator commands;

a flight control surface actuator coupled to receive the flight control surface actuator commands from the flight control surface actuator controller and configured, upon receipt thereof, to move the flight control surface to the commanded position;

a flight control inceptor configured to receive user input from a user and configured, in response to the user input, to supply inceptor command data;

a flight control computer in operable communication with the flight control inceptor and the flight control surface actuator controller, the flight control computer coupled to receive the inceptor command data from the flight control inceptor and configured, upon receipt of the inceptor command data, to generate and supply the flight control surface actuator position command data to the flight control surface actuator controller; and a digital surface position sensor in operable communication with the flight control computer and the flight control surface actuator controller, the digital surface position sensor comprising:

a position sensor adapted to be coupled to the aircraft flight control surface, the position sensor configured to sense a position of the aircraft flight control surface and supply a surface position signal representative thereof;

an adaptable hardware input comprising a plurality of pins configured to provide an identification signal in the form of an open or ground pattern that identifies the aircraft flight control surface to which the position sensor is coupled; and a processing circuit coupled to receive the surface position signal, the identification signal, and the flight control surface actuator position command data, the processing circuit configured to:

(i) process the surface position signal and the identification signal to generate sensor actuator position data representative of flight control surface actuator position, (ii) process the sensor actuator position data and the flight control surface actuator position command data to determine flight control surface actuator position error, and (iii) generate a fault signal when the flight control surface actuator position error exceeds a predetermined threshold.

16. The system of claim 15, wherein:

the processing circuit is further coupled to receive actuator controller position data from the flight control surface actuator controller, the actuator controller position data indicative of actual flight control surface actuator position;

the processing circuit is further configured to process the sensor actuator position data and the actuator controller position data to determine an actuator-to-surface position error; and generate a disconnection fault signal when the actuator-to-surface position error exceeds a predetermined threshold.

17. The system of claim 15, wherein:

the processing circuit implements a conversion algorithm to generate the sensor actuator position data; and the conversion algorithm is specific to the aircraft flight control surface to which the position sensor is coupled.

18. The system of claim 15, wherein:

the flight control surface actuator controller is further configured to implement a validation and selection logic scheme whereby, upon receipt of the flight control surface actuator position command data, the flight control surface actuator controller validates and selects the flight control surface actuator position command data from which to generate the flight control surface actuator commands; and the processing circuit implements the validation and selection logic scheme.

19. The system of claim 15, wherein the processing circuit is further configured to:

implement a digital filter, the digital filter operable to filter the flight control surface actuator position command data to thereby supply filtered flight control surface actuator position command data; and process the sensor actuator position data and the filtered flight control surface actuator position command data to determine the flight control surface actuator position error, wherein the digital filter is adapted to receive a reset signal.

20. The system of claim 15, wherein the processing circuit is further configured to implement a fault persistence time, the fault persistence time corresponding to a predetermined amount of time to wait before generating the fault signal when the actual flight control surface actuator position exceeds the predetermined threshold.

* * * * *